United States Patent
Good

(10) Patent No.: US 10,554,706 B1
(45) Date of Patent: Feb. 4, 2020

(54) MEDIA STREAMING USING A HEADLESS BROWSER

(71) Applicant: WOWZA MEDIA SYSTEMS, LLC, Golden, CO (US)

(72) Inventor: Charles F. Good, Cincinnati, OH (US)

(73) Assignee: Wowza Media Systems, LLC, Golden, CO (US)

(*) Notice: Subject to any disclaimer, the term of this patent is extended or adjusted under 35 U.S.C. 154(b) by 0 days.

(21) Appl. No.: 16/104,820

(22) Filed: Aug. 17, 2018

(51) Int. Cl.
*H04L 29/06* (2006.01)
*H04L 29/08* (2006.01)

(52) U.S. Cl.
CPC ........ *H04L 65/4069* (2013.01); *H04L 65/607* (2013.01); *H04L 67/02* (2013.01)

(58) Field of Classification Search
CPC .................................................. H04L 65/4069
USPC ......................................................... 709/219
See application file for complete search history.

(56) References Cited

U.S. PATENT DOCUMENTS

| | | | |
|---|---|---|---|
| 7,885,870 B2 | 2/2011 | Nam et al. | |
| 8,332,272 B2 | 12/2012 | Fisher | |
| 9,129,340 B1 | 9/2015 | Medina, III et al. | |
| 9,177,316 B2 | 11/2015 | Rao | |
| 9,922,007 B1* | 3/2018 | Jain | G06F 17/2247 |
| 10,009,773 B2 | 6/2018 | Smith et al. | |
| 2011/0119601 A1 | 5/2011 | Knothe et al. | |
| 2011/0252305 A1 | 10/2011 | Tschani et al. | |
| 2013/0246261 A1 | 9/2013 | Purves et al. | |
| 2013/0346302 A1 | 12/2013 | Purves et al. | |
| 2014/0189808 A1 | 7/2014 | Mahaffey et al. | |
| 2014/0379823 A1 | 12/2014 | Wilsher et al. | |
| 2015/0019944 A1 | 1/2015 | Kalgi | |
| 2015/0073959 A1 | 3/2015 | Connors et al. | |
| 2015/0271188 A1 | 9/2015 | Call | |
| 2015/0379554 A1 | 12/2015 | Copeland | |
| 2017/0070476 A1* | 3/2017 | Massoudi | H04L 67/306 |
| 2017/0093828 A1 | 3/2017 | Lupien et al. | |
| 2017/0093839 A1 | 3/2017 | Whiteside et al. | |
| 2017/0141953 A1 | 5/2017 | Vulich et al. | |
| 2018/0262910 A1 | 9/2018 | Smith et al. | |
| 2018/0267847 A1 | 9/2018 | Smith et al. | |

* cited by examiner

*Primary Examiner* — Adnan M Mirza
(74) *Attorney, Agent, or Firm* — McDonnell Boehnen Hulbert & Berghoff LLP

(57) ABSTRACT

A method includes receiving an input media stream at a hardware encoder. The method also includes executing, at a processor of the hardware encoder, a headless browser to retrieve an instance of a dynamic web page that includes additional content. The method also includes storing the additional content at a memory that is accessible to the processor and encoding circuitry of the hardware encoder. The method further includes retrieving, at the encoding circuitry, the additional content from the memory and encoding the input media stream to generate an output media stream. At least one frame of the output media stream includes at least a portion of the additional content in conjunction with at least a portion of a corresponding frame of the input media stream.

20 Claims, 5 Drawing Sheets

MEDIA STREAMING USING A HEADLESS BROWSER

FIELD

The present disclosure is generally related to media streaming.

BACKGROUND

Additional content, such as a background, a title, special effects, etc., can be added to a media stream at an encoder. As a non-limiting example, a video camera can capture a live stream and provide the live stream (e.g., a media stream) to the encoder. Upon receiving the live stream, the encoder can add additional content to the live stream prior to encoding the live stream. As an illustrative example, the encoder can add a background to the live stream to enhance the experience for an end-user viewing the live stream. Once the additional content is added to the live stream, the encoder can encode the live stream and the additional content into an encoded media stream. The encoded media stream can then be transmitted to a remote device. For example, the encoded media stream may be transmitted to a social media server. Upon reception of the encoded media stream, the social media server can decode and publish the contents (e.g., the live stream with the additional content) to one or more end-users.

However, because the additional content is added to the live stream and encoded into a single stream, problems associated with the additional content may affect encoding of the live stream. For example, encoding of the live stream can be delayed if the encoder is unable to timely retrieve the additional content. To illustrate, a delay may be introduced if encoder stalls or crashes while attempting to retrieve the additional content for the live stream. As a result, end-users may experience a less than optimal playback of the live stream.

SUMMARY

Systems and methods of media streaming using a headless browser are disclosed. According to the systems and methods described herein, an input media stream is provided to a hardware encoder. As a non-limiting example, the input media stream may be a live stream of a person talking in front of a camera. Encoding circuitry of the hardware encoder encodes the input media stream to generate a portion of an encoded media stream (e.g., an output media stream) that is to be transmitted to a publishing device. For example, the publishing device may be a social media platform that is operable to decode the contents of the encoded media stream, distribute the decoded contents to end user, etc. A playback device, such as a media player, may playback the decoded contents (e.g., the live stream of the person talking).

To enhance playback, prior to transmission of the encoded media stream, the hardware encoder utilizes a headless browser to add additional content (e.g., social media interactions, a title, a webpage, a background, etc.) to the encoded media stream. As used herein, a "headless browser" is an instance of a web browser that is executed by a device, such as the hardware encoder, without display of a graphical user interface (GUI). Thus, while the headless browser may be used to send and receive web data (e.g., via hypertext transfer protocol (HTTP) GET commands, POST commands, etc.), the headless browser itself may not display such web data.

To illustrate, a processor of the hardware encoder may provide a Uniform Resource Locator (URL) of a dynamic web page to the headless browser. The dynamic web page, and the content (e.g., the "additional" content) available on the dynamic web page, may be controlled by a web application. As a non-limiting example, a third-party operator can, in real-time, create, edit, and activate the additional content on the dynamic web page. The additional content can include pre-created graphics accessible to the third-party operator, graphics dynamically created by the third-party operator based on the content of the live stream, graphics from comments or reactions provided by viewers of the live stream, etc. The processor executes the headless browser to retrieve, using the URL, an instance of the dynamic web page that includes the additional content. The additional content is stored, by the processor, at a memory of the hardware encoder.

The encoding circuitry retrieves the additional content from the memory to use the additional content while encoding the input media stream. In some implementations, the additional content is file locked while stored at the memory to ensure that a full frame of the additional content is retrieved by the encoding circuitry for encoding. In other implementations, the additional content is semaphore locked while stored at the memory to ensure that a full frame of the additional content is retrieved by encoding circuitry for encoding. The encoding circuitry encodes the input media stream with the additional content retrieved from the memory to generate the encoded media stream. Thus, the encoding circuitry adds additional content to the live media stream that is retrieved by executing the headless browser as a separate service (that is distinct from the encoding circuitry). The encoded media stream is transmitted to the publishing device.

Because the headless browser is executed as a separate service from the encoding circuitry, in scenarios where performance of the headless browser is suboptimal (e.g., the additional content is stalled or otherwise becomes unavailable), the encoding circuitry continues encoding the input media stream without the additional content. Thus, the hardware encoder can transmit a version of the encoded media stream to the publishing device without the additional content when performance of the headless browser is suboptimal or when there is not additional content readily available to the encoding circuitry, rather than encoding becoming stalled or otherwise negatively impacted due to issues with the additional content. The publishing device decodes the encoded media stream to recover the contents (e.g., the live stream and the additional content). A playback device, such as a media player, can playback the recovered content for a user.

Thus, the described techniques enable the hardware encoder to add additional content to a live stream using a headless browser as a separate service. Because the headless browser is executed independent from the encoding operations of the hardware encoder, latency is improved in scenarios where the headless browser experiences suboptimal performance (e.g., stalls, crashes, etc.). For example, if the headless browser experiences suboptimal performance such that additional content is unavailable, the hardware encoder can continue encoding the live stream in such a manner that latency in substantially unaffected.

DETAILED DESCRIPTION

Media encoders can be classified into hardware encoders and software encoders. Hardware encoders typically include special purpose electrical circuitry/components that are selected to perform a subset of tasks, such as executing encoding algorithms, efficiently. Software encoders typically include software modules that are capable of executing encoding algorithms on general-purpose computing hardware, and may therefore be used on a wide variety of hardware platforms (e.g., personal computers, on-premises servers, cloud servers, etc.). Additionally, in some implementations, hardware encoders can use software video encoding systems and software audio encoding systems to perform encoding operations. For a given encoding workflow, a hardware encoder can be expected to provide lower latency and/or higher quality than a software encoder, but at the expense of workflow flexibility, because hardware is more difficult to reprogram/reconfigure than software. The present disclosure describes a hardware encoder and methods of operation at the hardware encoder, including encoding a media stream and running a headless browser at the hardware encoder.

Figure 1:
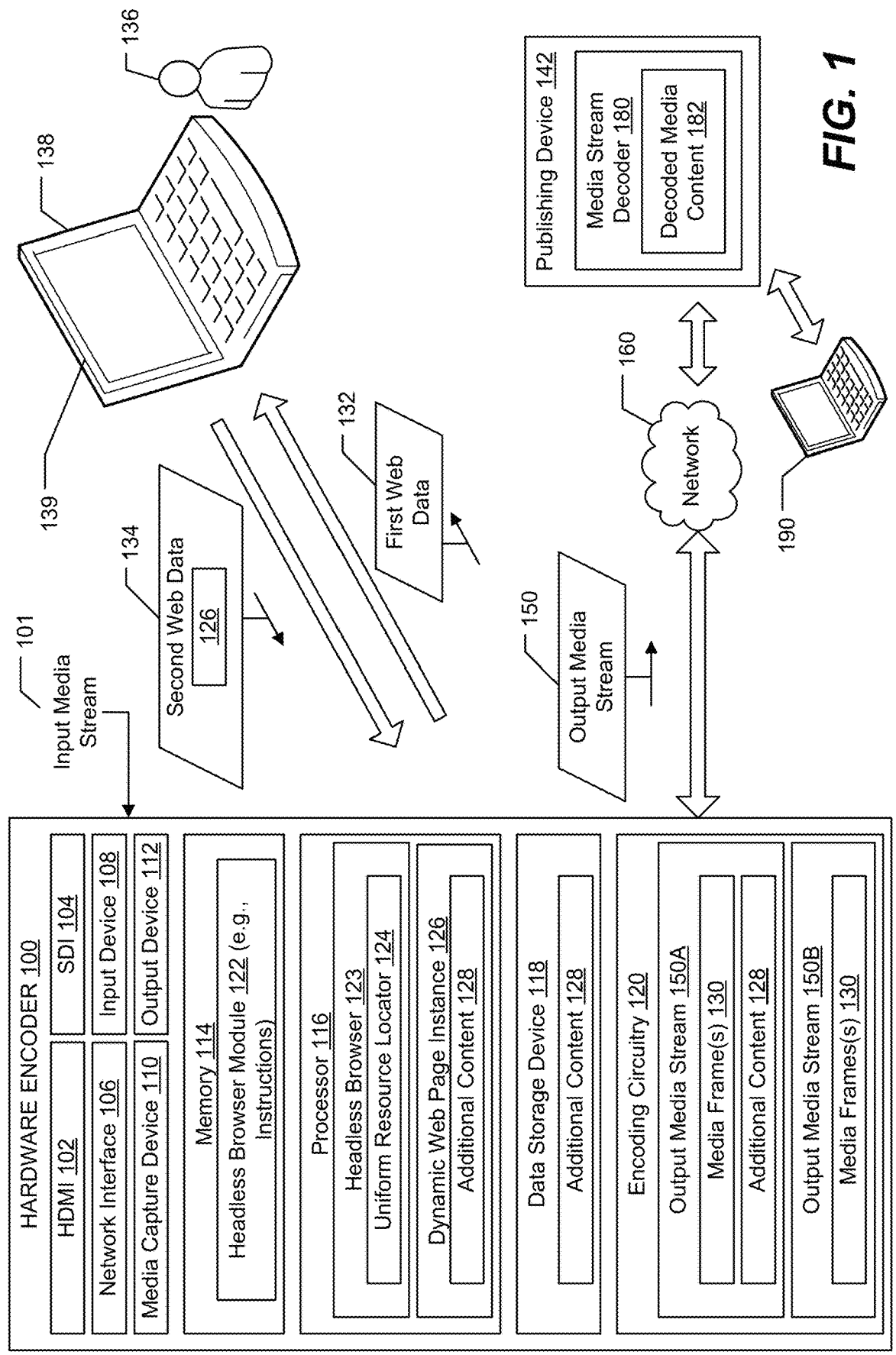
FIG. 1 is a diagram to illustrate a particular implementation of a hardware encoder that streams media and additional content using a headless browser.

An illustrative example of a hardware encoder 100 is shown in FIG. 1. In a particular example, the hardware encoder 100 is configured to receive an input media stream 101 via one or more input interfaces, such as via a high definition multimedia interface (HDMI) 102 or a serial digital interface (SDI) 104. The input media stream 101 may correspond to live media or previously recorded media (e.g., video on demand (VOD) and/or digital video recorder (DVR)) content. As a non-limiting example, the input media stream 101 may include a live stream of a person talking. In other implementations, the input media stream 101 may include other video content, image content, audio content, or a combination thereof.

The hardware encoder 100 includes a network interface 106, and input device 108, a media capture device 110, an output device 112, a memory 114, a processor 116, a data storage device 118, and encoding circuitry 120. As described below, the memory 114 is a non-transitory computer-readable medium that includes instructions that are executable by the processor 116. In an illustrative implementation, the data storage device 118 includes a solid-state drive (SSD) device, although it is to be understood that alternate forms of magnetic, optical, or other data storage may also be used. According to some implementations, the data storage device 118 and the memory can be implemented as a single component. For example, the data storage device 118 can be integrated into the memory 114 such that memory 114 and the data storage device 118 correspond to a single storage component of the hardware encoder 100.

According to one implementation, the media capture device 110 captures the input media stream 101. After capture, the media capture device 110 provides the input media stream 101 to the encoding circuitry 120 for encoding. In an illustrative example, the network interface 106 includes wired and/or wireless interfaces, including but not limited to an Ethernet interface, a wireless interface compatible with an Institute of Electrical and Electronics Engineers (IEEE) 802.11 protocol, a universal serial bus (USB) interface, a low-power communication interface, and/or other interfaces. According to some implementations, the input device 108 can be a button and the output device 112 can be a light emitting diode (LED) status indicator, a liquid crystal display (LCD) screen, etc. In alternate examples, different types of status indicators and/or display devices may be used.

Examples of media formats supported by the hardware encoder 100 include, but are not limited to, a hypertext transfer protocol (HTTP) live streaming (HLS) format that may be provided to iOS® devices (iOS is a registered trademark of Cisco Systems, Inc. of San Jose, Calif. and is used by Apple Inc. of Cupertino, Calif. under license), a HTTP dynamic streaming (HDS) format that may be provided to a device that is compatible with video for Adobe® Flash® (Adobe and Flash are registered trademarks of Adobe Systems Inc. of San Jose, Calif.), smooth streaming (e.g., an Internet Information Services (IIS) extension from Microsoft Corp. to implement adaptive bitrate streaming and provide media streams to devices running Microsoft® Silverlight® or other smooth streaming clients (Microsoft and Silverlight are registered trademarks of Microsoft Corp. of Redmond, Wash.)), and motion picture experts group (MPEG) dynamic adaptive streaming over HTTP (MPEG-DASH) (also known as international organization for standardization (ISO)/international electro-technical commission (IEC) 23009-1). Additional audio formats, video formats, data formats and or coder/decoders (CODECs) may also be supported.

The memory 114, such as a random access memory (RAM), and/or the data storage device 118 may store instructions executable by the processor 116, which may be a single-core or multi-core processor. Although a single processor 116 is shown, in some implementations, the hardware encoder 100 may include multiple processors, such as a central processing unit (CPU), a graphical processing unit (GPU), and/or a digital signal processor (DSP).

In an illustrative implementation, the executable instructions represent a headless browser module 122. The processor 116, upon execution of the instructions associated with the headless browser module 122, is configured to execute a headless browser 123 to retrieve a dynamic web page instance 126 that includes additional content 128 for the input media stream 101. The headless browser 123 is an instance of a web browser that is executed by a device, such as the hardware encoder 100, without display of a graphical user interface (GUI). The additional content 128 can include a semitransparent image that is to be overlaid on top of content associated with the input media stream 101 (e.g., video of a person talking) using alpha blending. As another example, the additional content 128 can include at least one image that is overlaid on top of content associated with the input media stream 101 using an offset value. For example, the offset value can correspond to an x-y coordinate offset from a center of a frame such that, when displayed, the additional content 128 is visible along with the content associated with the frame.

The additional content 128 can be based on content associated with the input media stream 101. As a non-limiting example, if the input media stream includes a video of a video blogger talking, the additional content 128 can include images of social media interactions about the video blogger. In some implementations, the additional content 128 can include images of social media interactions that are directed to a social media account of the video blogger (e.g., social media interactions that "tag" the video blogger).

During execution of the instructions associated with the headless browser module 122, the processor 116 can provide a Uniform Resource Locator 124 of a dynamic web page 139 to the headless browser 123 to generate first web data 132 that is sent to a remote server 138 controlled by an operator 136. For example, the network interface 106 can send the first web data 132 to the remote server 138 via a network 160. While the headless browser 123 may be used to send and receive web data, the headless browser 123 itself does not display web data. The first web data 132 can include a hypertext transfer protocol (HTTP) GET command, a POST command, etc. As a non-limiting example, the first web data 132 can include an HTTP GET command that, upon execution, attempts to retrieve information from the dynamic website 139 controlled by the operator 136.

Upon receiving the first web data 132, the remote server 138 sends second web data 134 to the hardware encoder 100. The second web data 134 may be a HTTP response message that includes the dynamic web page instance 126 (e.g., an instance of the dynamic web page 139) or a portion thereof. The dynamic web page instance 126 includes the additional content 128 for the live stream (e.g., the input media stream 101). The additional content 128 can be controlled and edited by a web application available to the operator 136. The operator 136 can, in real-time, create, edit, and activate the additional content 128 on the dynamic web page 139. The additional content 128 can include at least one of pre-created graphics accessible to the operator 136, graphics dynamically created by the operator 136 based on the content of the input media stream 101, graphics from comments or reactions provided by viewers of the input media stream 101, or other graphics. As described with respect to FIGS. 2-4, the additional content 128 can correspond to at least one of an overlay graphic for the live stream, a title for the live stream, or social interaction feedback associated with the live stream. However, it should be understood that the additional content 128 can be any content or images that can be made available through the dynamic website 139.

The network interface 106 of the hardware encoder 100 is configured to receive the second web data 134 from the remote server 138. The processor 116 is also configured to store the additional content 128 included in the second web data 134 at the data storage device 118. The data storage device 118 is accessible to the encoding circuitry 120 and to the processor 116.

The encoding circuitry 120 is configured to retrieve the additional content 128 from the data storage device 118 to encode the additional content 128 with the input media stream 101. In some implementations, the additional content 128 is file locked while stored at the data storage device 118 to ensure that a full frame of the additional content 118 is retrieved by the encoding circuitry 120 for encoding. In other implementations, the additional content 128 is semaphore locked while stored at the data storage device 118 to ensure that a full frame of the additional content 128 is retrieved by encoding circuitry 120 for encoding. The data storage device 118 (or in other implementations the memory 114) may thus serve as a shared memory and communication medium between the processor 116 and the encoding circuitry 120.

The encoding circuitry 120 is configured to encode the additional content 128 with the input media stream 101 to generate an output media stream 150A. The hardware encoder 100 can send the output media stream 150A to the publishing device 142 using Transport Layer Security (TLS) encryption, Secure Sockets Layer (SSL) encryption, or another encryption method. The output media stream 150A includes at least a portion of the additional content 128 in conjunction with at least a portion of a corresponding media frame 130 of the input media stream 101. For example, upon retrieving the additional content 128 from the data storage device 118, the encoding circuitry 120 can encode one or more media frames 130 of the input media stream 101 with the additional content 128 to generate corresponding frames of the output media stream 150A. The encoding circuitry 120 can encode the one or more media frames 130 such that, upon playback, the additional content 128 is overlaid on top of the content associated with the one or more media frames 130 at a position (e.g., an x-y offset) such that that the additional content 128 can be seen without interfering with the live stream. As a non-limiting example, if the one or more media frames 130 include a person talking in front of the camera, the encoding circuitry 120 can encode the one or more media frames 130 such that, upon playback, the additional content 128 is overlaid on top of the live stream at a position such that the head of the person can continue to be seen by the viewers.

According to some implementations, the data storage device 118 can store the dynamic web page instance 126 and the encoding circuitry 120 can encode the dynamic web page instance 126 with the one or more media frames 130 of the input media stream 101. In this scenario, the dynamic web page instance 126 can include a transparent background and the media frames 130 of the input media stream 101 can be shown through the transparent background of the dynamic web page instance 126. In another scenario, either the dynamic web page instance 126 or the media frames 130 can include a green screen background and content from the other can replace the green screen background using green screening (e.g., green keying) techniques.

The output media stream 150A (e.g., an encoded media stream) can be transmitted to a publishing device 142 via the network 160. For example, the network interface 106 can transmit the output media stream 150A to the publishing device 142 as an output media stream 150. A media stream decoder 180 of the publishing device 142 can decode the output media stream 150A to generate the decoded media content 182. For example, a frame of the decoded media content 182 includes content from a corresponding one of the media frames 130 and the additional content 128. One or more end-user devices 190 can access and playback the decoded media content 182.

However, in scenarios where the performance of the headless browser 123 is suboptimal (e.g., in scenarios where the additional content 128 is stalled or otherwise becomes unavailable to the encoding circuitry 120), the encoding circuitry 120 can continue encoding the input media stream 101 without the additional content 128. Thus, by running the headless browser 123 as a separate operation from the encoding circuitry 120, disruptions associated with the headless browser 123 do not affect encoding and transmission of the input media stream 101 to the publishing device 142. Rather, from an end user's perspective, an overlay logo may simply briefly disappear from view rather than the entire video stream stuttering or terminating.

To illustrate, the encoding circuitry 120 is configured to continue encoding the one or more media frames 130 of the input media stream 101 in response to a determination that particular additional content is unavailable at the data storage device 118. For example, if disruptions associated with the headless browser 123 cause a delay by which particular additional content for a particular media frame 130 is unavailable at the time of encoding of the particular media frame 130, the encoding circuitry 120 can encode the particular media frame 130 and generate an output media stream 150B without the particular additional content. The output media stream 150B can be transmitted to the publishing device 142 via the network 160. For example, the network interface 106 can transmit the output media stream 150B to the publishing device 142 as the output media stream 150. The media stream decoder 180 can decode the output media stream 150B to generate the decoded media content 182. For example, the decoded media content 182 includes the media frames 130 of the input media stream 101 without additional content. One or more end-user devices 190 can access and playback the decoded media content 182.

Thus, the processor 116 of the hardware encoder 100 can retrieve the additional content 128 for the input media stream 101 using the headless browser 123 as a separate service from the encoding circuitry 120. Because the headless browser 123 is executed independent from the encoding circuitry 120, latency is improved in scenarios where the headless browser 123 experiences suboptimal performance (e.g., stalls, crashes, etc.). For example, if the headless browser 123 experiences suboptimal performance such that the additional content 128 is unavailable, the encoding circuitry 120 can continue encoding the input media stream 101 in such a manner that latency in substantially unaffected.

Figure 2:
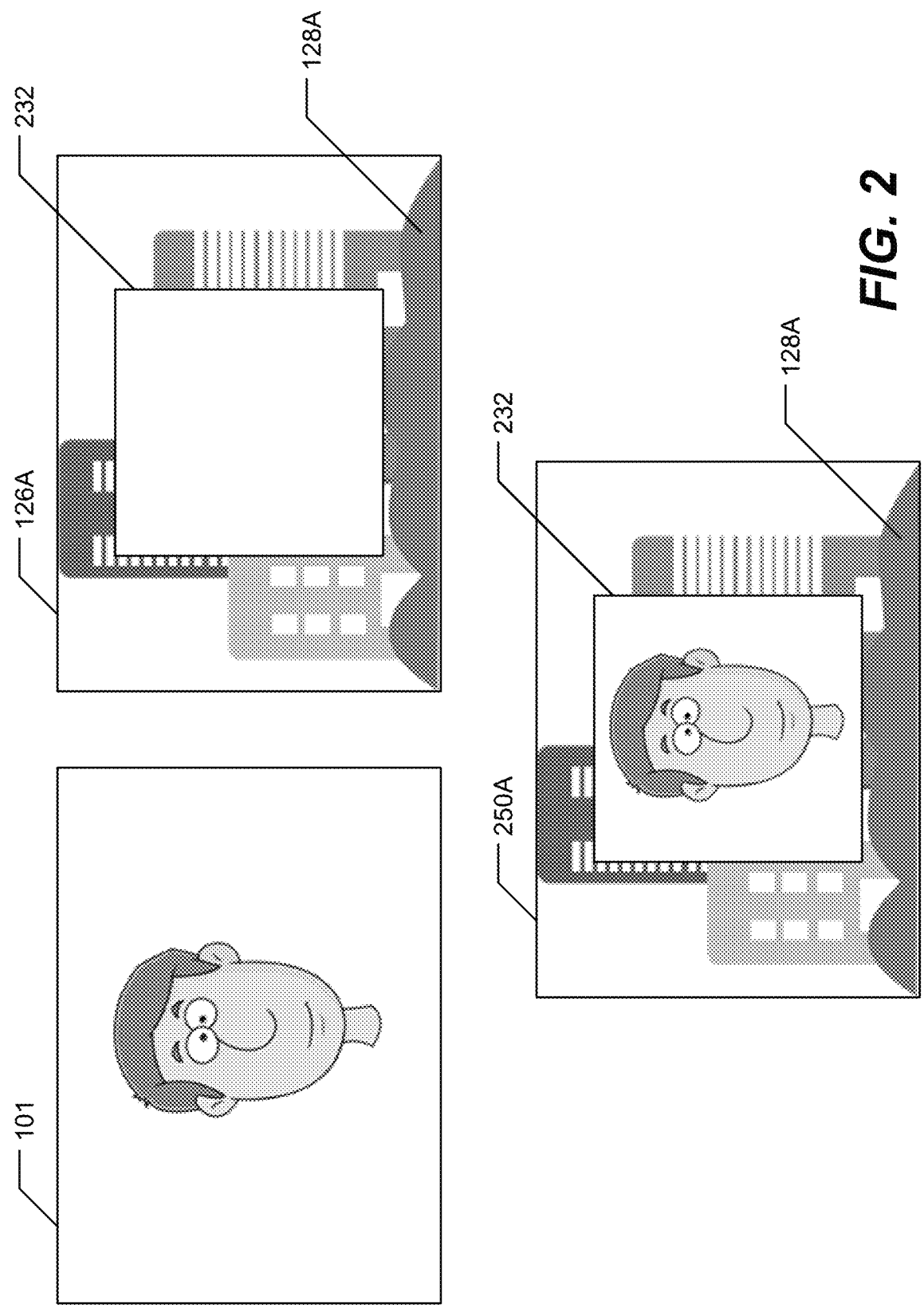
FIG. 2 illustrates non-limiting examples of content associated with the hardware encoder of FIG. 1.

FIG. 2 illustrates non-limiting examples of content associated with the techniques described with respect to FIG. 1. For example, FIG. 2 illustrates the input media stream 101, a dynamic web page instance 126A corresponding to the dynamic web page 126 of FIG. 1, and an output media stream 250A corresponding to the output media stream 150A of FIG. 1.

In FIG. 2, the input media stream 101 includes a live stream of a person talking in front of a camera (e.g., the media capture device 110). The dynamic web page instance 126A includes additional content 128A. In FIG. 2, the additional content 128A includes graphics, such as graphics of a city skyline. The dynamic web page instance 126A includes an area 232 that enables the input media stream 101 to be shown. According to one implementation, the area 232 is transparent. In another implementation, the area 232 is a green screen background.

The output media stream 250A includes the additional content 128A and the portion of the input media stream 101 shown in the area 232 of the dynamic web page 126A. Thus, when the headless browser 123 functions properly and the dynamic web page 126A is accessible to the encoding circuitry 120, the encoding circuitry 120 encodes the input media stream 101 with the dynamic web page instance 126A to generate the output media stream 250A. The output media stream 250A includes at least a portion of the additional content 128A in conjunction with at least a portion of a corresponding media frame of the input media stream 101. For example, upon retrieving the additional content 128A from the data storage device 118, the encoding circuitry 120 encodes one or more media frames of the input media stream 101 with the additional content 128A to generate the output media stream 250A.

Figure 3:
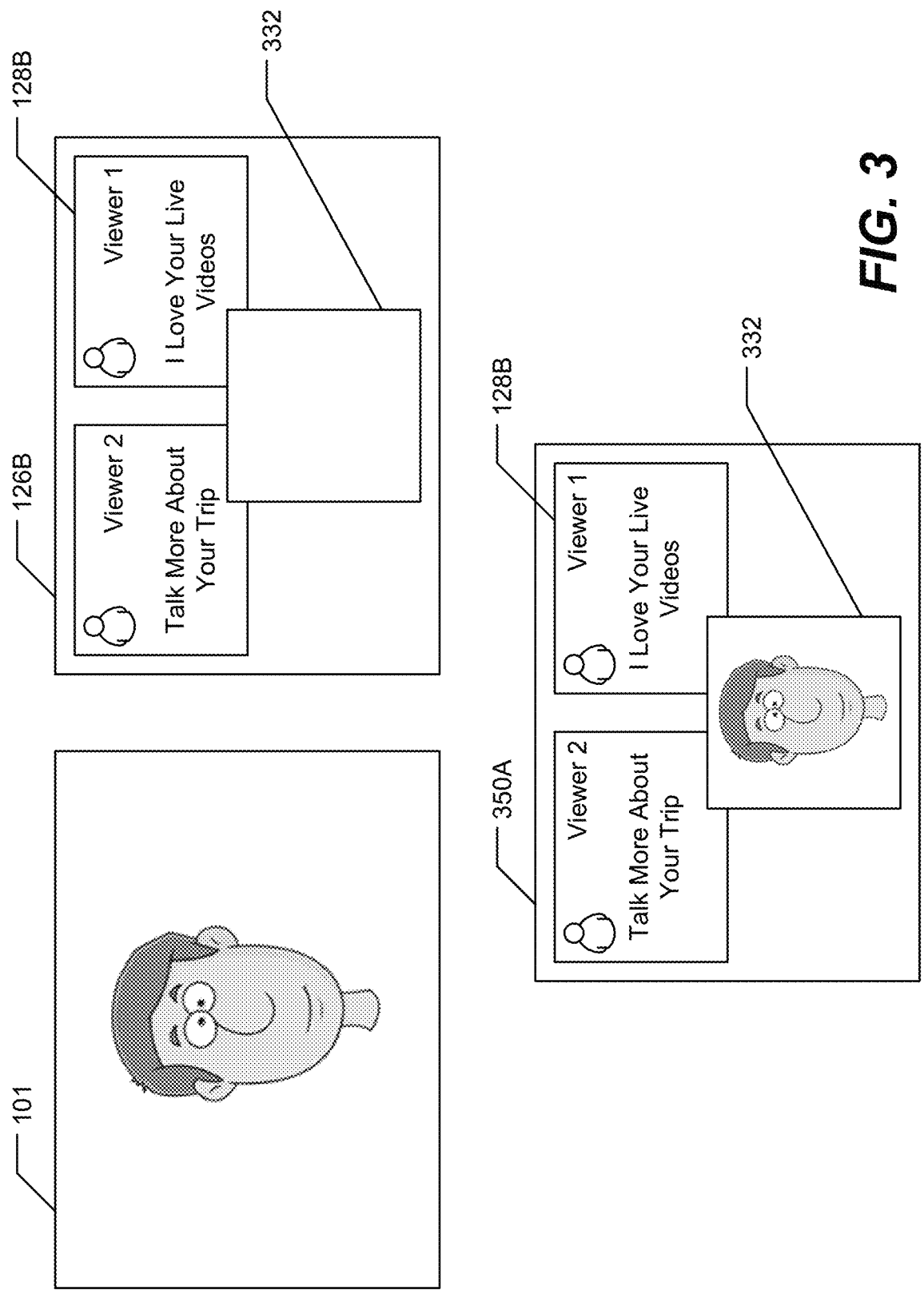
FIG. 3 illustrates other non-limiting examples of content associated with the hardware encoder of FIG. 1.

FIG. 3 illustrates additional non-limiting examples of content associated with the techniques described with respect to FIG. 1. For example, FIG. 3 illustrates the input media stream 101, a dynamic web page instance 126B corresponding to the dynamic web page 126 of FIG. 1, and an output media stream 350A corresponding to the output media stream 150A of FIG. 1.

In FIG. 3, the input media stream 101 includes a live stream of a person talking in front of a camera (e.g., the media capture device 110). The dynamic web page instance 126B includes additional content 128B. The additional content 128B includes social interaction feedback associated with the input media stream 101. For example, the social interaction feedback includes a first interaction from a first viewer (Viewer1) and a second interaction from a second viewer (Viewer2). Each interaction may be addressed (e.g., directed) to an account or social media profile associated with the person in the media stream 101 and may be visible by virtue of, for example, linking to a Really Simple Syndication (RSS) or other social media feed. The dynamic web page instance 126B also includes an area 332 that enables the input media stream 101 to be shown. According to one implementation, the area 332 is a transparent background. In another implementation, the area 332 is a green screen background. In an alternate example, the dynamic web page instance 126B may not include the area 332, and instead may include offset information (which may not be visible) that instructs the encoding circuitry 120 wherein a video frame to add the additional content 128B.

The output media stream 350A includes the additional content 128B and the portion of the input media stream 101 shown in the area 332 of the dynamic web page 126B. Thus, when the headless browser 123 functions properly and the dynamic web page 126B is accessible to the encoding circuitry 120, the encoding circuitry 120 encodes the input media stream 101 with the dynamic web page instance 126B to generate the output media stream 350A. The output media stream 350A includes at least a portion of the additional content 128B in conjunction with at least a portion of a corresponding media frame of the input media stream 101. For example, upon retrieving the additional content 128B from the data storage device 118, the encoding circuitry 120 encodes one or more media frames of the input media stream 101 with the additional content 128B to generate the output media stream 350A.

Figure 4:
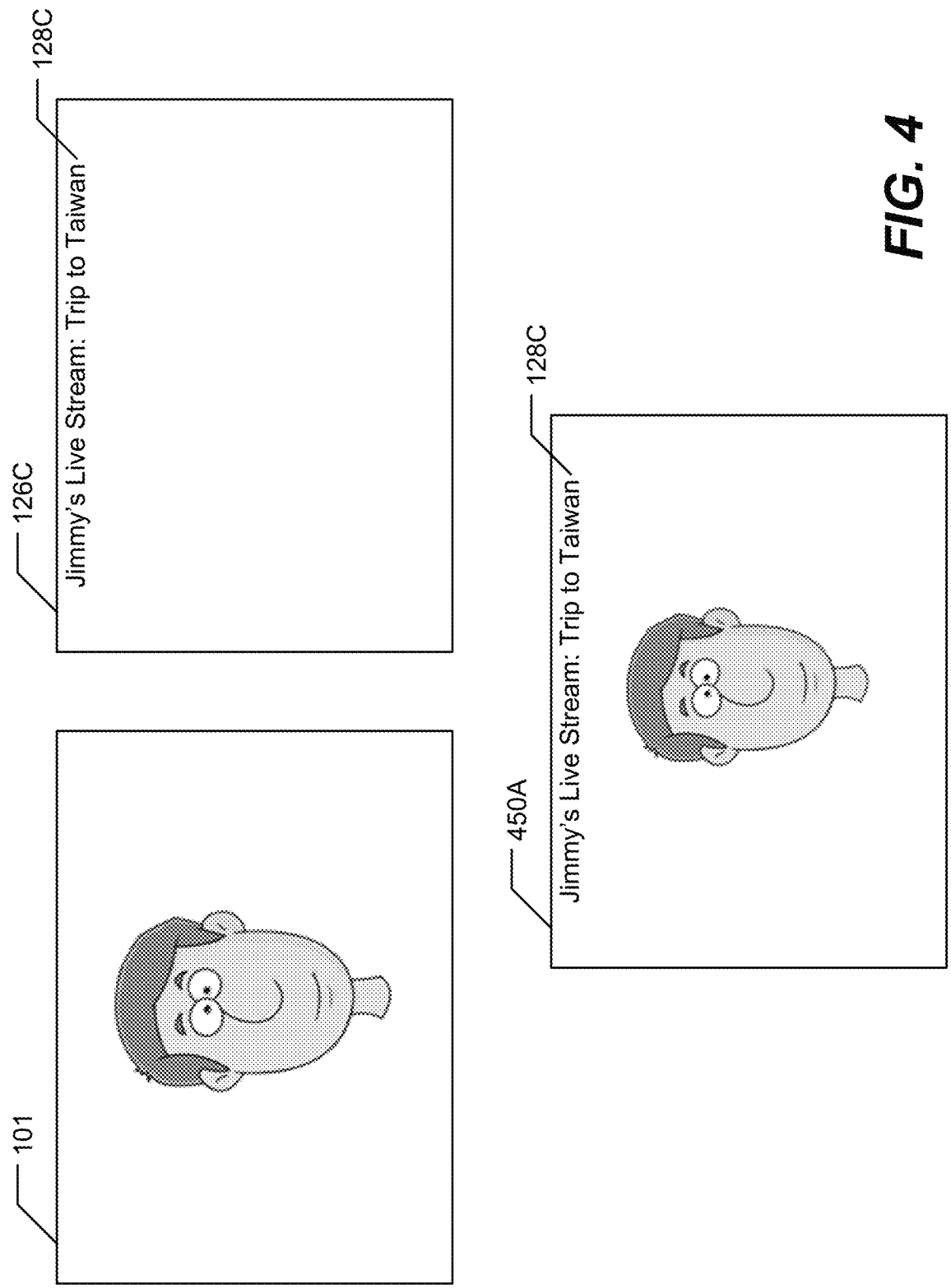
FIG. 4 illustrates other non-limiting examples of content associated with the hardware encoder of FIG. 1.

FIG. 4 illustrates additional non-limiting examples of content associated with the techniques described with respect to FIG. 1. For example, FIG. 4 illustrates the input media stream 101, a dynamic web page instance 126C corresponding to the dynamic web page 126 of FIG. 1, and an output media stream 450A corresponding to the output media stream 150A of FIG. 1.

In FIG. 4, the input media stream 101 includes a live stream of a person talking in front of a camera (e.g., the media capture device 110). The dynamic web page instance 126C includes additional content 128C. The additional content 128B includes a title (e.g., "Jimmy's Live Stream: Trip to Taiwan").

The output media stream 450A includes the additional content 128C and the input media stream 101. Thus, when the headless browser 123 functions properly and the dynamic web page 126C is accessible to the encoding circuitry 120, the encoding circuitry 120 encodes the input media stream 101 with the dynamic web page instance 126C to generate the output media stream 450A. The output media stream 450A includes at least a portion of the additional content 128C in conjunction with at least a portion of a corresponding media frame of the input media stream 101. For example, upon retrieving the additional content 128C from the data storage device 118, the encoding circuitry 120 encodes one or more media frames of the input media stream 101 with the additional content 128C to generate the output media stream 450A. According to one implementation, the encoding circuitry 120 determines a location (e.g., an x-y coordinate position) of the additional content 128B based on metadata.

Figure 5:
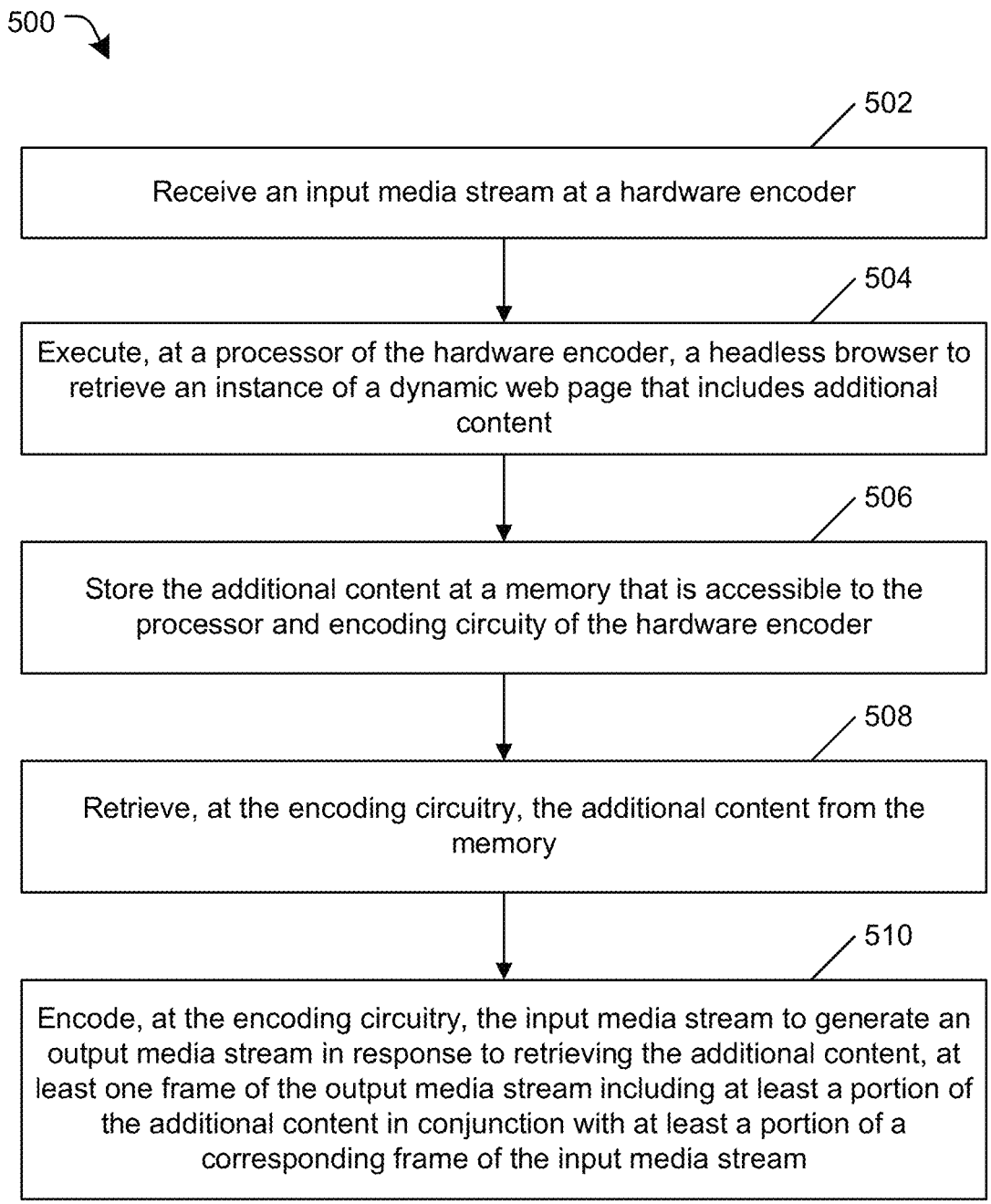
FIG. 5 is a flowchart to illustrate a particular implementation of a method for streaming media content using a headless browser.

FIG. 5 is a flowchart to illustrate a particular implementation of a method 500 for streaming media and additional content using a headless browser. The method 500 may be performed by the hardware encoder 100 of FIG. 1.

The method 500 includes receiving an input media stream at a hardware encoder, at 502. For example, referring to FIG. 1, the media capture device 110 captures the input media stream 101. The hardware encoder 100 may receive the input media stream 101 via one or more input interfaces, such as via the HDMI 102 or the SDI 104. After capture, the media capture device 110 provides the input media stream 101 to the encoding circuitry 120 for encoding.

The method 500 also includes executing, at a processor of the hardware encoder, a headless browser to retrieve an instance of a dynamic web page that includes additional content, at 504. For example, referring to FIG. 1, the processor 116, upon execution of the instructions associated with the headless browser module 122, executes the headless browser 123 to retrieve the dynamic web page instance 126 that includes the additional content 128 for the input media stream 101. To illustrate, the processor 116 provides the URL 124 of the dynamic web page 139 to the headless browser 123 to generate first web data 132 that is sent to the remote server 138 controlled by the operator 136. Upon receiving the first web data 132, the remote server 138 sends second web data 134 to the hardware encoder 100. The second web data 134 may be a HTTP response message that includes the dynamic web page instance 126 (e.g., an instance of the dynamic web page 139) or a portion thereof. The dynamic web page instance 126 includes the additional content 128 for the live stream (e.g., the input media stream 101).

The method 500 also includes storing the additional content at a memory that is accessible to the processor and to encoding circuitry of the hardware encoder, at 506. For example, referring to FIG. 1, the processor 116 stores the additional content 128 at the data storage device 118. In some implementations, the additional content 128 is file locked while stored at the data storage device 118 to ensure that a full frame of the additional content 118 is retrieved by the encoding circuitry 120 for encoding. In other implementations, the additional content 128 is semaphore locked while stored at the data storage device 118 to ensure that a full frame of the additional content 128 is retrieved by encoding circuitry 120 for encoding.

The method 500 also includes retrieving, at the encoding circuitry, the additional content from the memory, at 508. For example, referring to FIG. 1, the encoding circuitry 120 retrieves the additional content 128 from the data storage device 118 to encode the additional content 128 with the input media stream 101.

The method 500 also includes encoding, at the encoding circuitry, the input media stream to generate an output media stream in response to retrieving the additional content, at 510. At least one frame of the output media stream includes at least a portion of the additional content in conjunction with at least a portion of a corresponding frame of the input media stream. For example, referring to FIG. 1, the encoding circuitry 120 encodes the input media stream 101 with the additional content 128 to generate the output media stream 150A. The output media stream 150A includes at least a portion of the additional content 128 in conjunction with at least a portion of a corresponding media frame 130 of the input media stream 101. For example, upon retrieving the additional content 128 from the data storage device 118, the encoding circuitry 120 can encode one or more media frames 130 of the input media stream 101 with the additional content 128 to generate the output media stream 150A.

According to some implementations, the method 500 includes transmitting the output media stream to a publishing destination. For example, referring to FIG. 1, the network interface 106 transmits the output media stream 150A to the publishing device 142 as the output media stream 150.

According to one implementation, in response to a determination that particular additional content is unavailable at the memory, the method 500 includes continuing encoding of the input media stream without the particular additional content. For example, referring to FIG. 1, in scenarios where the performance of the headless browser 123 is suboptimal (e.g., in scenarios where the additional content 128 is stalled or otherwise becomes unavailable to the encoding circuitry 120), the encoding circuitry 120 can continue encoding the input media stream 101 without the additional content 128. By running the headless browser 123 as a separate operation from the encoding circuitry 120, disruptions associated with the headless browser 123 do not affect encoding and transmission of the input media stream 101 to the publishing device 142.

To illustrate, the encoding circuitry 120 continues encoding the one or more media frames 130 of the input media stream 101 in response to a determination that particular additional content is unavailable at the data storage device 118. For example, if disruptions associated with the headless browser 123 cause a delay by which particular additional content for a particular media frame 130 is unavailable at the time of encoding of the particular media frame 130, the encoding circuitry 120 can encode the particular media frame 130 and generate an output media stream 150B without the particular additional content.

Thus, the method 500 enables the processor 116 of the hardware encoder 100 to retrieve the additional content 128 for the input media stream 101 using the headless browser 123 as a separate service from the encoding circuitry 120. Because the headless browser 123 is executed independent from the encoding circuitry 120, latency is improved in scenarios where the headless browser 123 experiences suboptimal performance (e.g., stalls, crashes, etc.). For example, if the headless browser 123 experiences suboptimal performance such that the additional content 128 is unavailable, the encoding circuitry 120 can continue encoding the input media stream 101 in such a manner that latency in substantially unaffected.

It is to be understood that the order of steps or operations described with reference to FIGS. 1-5 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular implementations can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the hardware encoder 100, the remote server 138, the publishing device 142, or the end-user device 190.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular implementation, the instructions can be embodied in a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

As used herein, a "live" stream may differ from a "video on demand" (VOD) stream and a "digital video recorder" (DVR) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

According to one implementation of the techniques described herein, a hardware encoder includes an input interface configured to receive an input media stream. The hardware encoder also includes a memory and a processor coupled to the memory. The processor is configured to execute a headless browser to retrieve an instance of a dynamic web page that includes additional content. The processor is also configured to store the additional content at the memory. The hardware encoder also includes encoding circuitry coupled to the input interface and to the memory. The encoding circuitry is configured to retrieve the additional content from the memory. In response to retrieving the additional content from the memory, the encoding circuitry is configured to encode the input media stream to generate an output media stream. At least one frame of the output media stream includes at least a portion of the additional content in conjunction with at least a portion of a corresponding frame of the input media stream.

According to another implementation of the techniques described herein, a method includes receiving an input media stream at a hardware encoder. The method also includes executing, at a processor of the hardware encoder, a headless browser to retrieve an instance of a dynamic web page that includes additional content. The method also includes storing the additional content at a memory that is accessible to the processor and encoding circuitry of the hardware encoder. The method further includes retrieving, at the encoding circuitry, the additional content from the memory and encoding the input media stream to generate an output media stream. At least one frame of the output media stream includes at least a portion of the additional content in conjunction with at least a portion of a corresponding frame of the input media stream.

According to another implementation of the techniques described herein, a non-transitory computer-readable medium includes instructions that, when executed by a processor within a hardware encoder, cause the processor to execute a headless browser to retrieve an instance of a dynamic web page that includes additional content for an input media stream. The instructions, when executed by the processor, also cause the processor to store the additional content at a memory that is accessible to the processor and encoding circuitry of the hardware encoder. The encoding circuitry is configured to retrieve the additional content form the memory and encode the input media stream to generate an output media stream in response to retrieving the additional content. At least one frame of the output media stream includes at least a portion of the additional content in conjunction with at least a portion of a corresponding frame of the input media stream.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations.

The above-disclosed subject matter is to be considered illustrative, and not restrictive, and the appended claims are intended to cover all such modifications, enhancements, and other implementations, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A hardware encoder comprising:
an input interface configured to receive an input media stream;
a memory;
a processor coupled to the memory, the processor configured to:
execute a headless browser to retrieve an instance of a dynamic web page that includes additional content; and
store the additional content at the memory; and
encoding circuitry coupled to the input interface and to the memory, the encoding circuitry configured to:
retrieve the additional content from the memory; and
in response to retrieving the additional content, encode the input media stream to generate an output media stream, at least one frame of the output media stream including at least a portion of the additional content retrieved from the memory in conjunction with at least a portion of a corresponding frame of the input media stream.

2. The hardware encoder of claim 1, further comprising a network interface coupled to the encoding circuitry, the network interface configured to transmit the output media stream to a publishing destination.

3. The hardware encoder of claim 1, wherein the processor is configured to provide a Uniform Resource Locator (URL) of the dynamic web page to the headless browser to retrieve the instance of the dynamic web page.

4. The hardware encoder of claim 1, wherein the instance of the dynamic web page comprises a transparent portion.

5. The hardware encoder of claim 1, wherein at least one of the instance of the dynamic web page or the frame of the input media stream comprises a green screen background.

6. The hardware encoder of claim 1, wherein the additional content is controlled by a web application.

7. The hardware encoder of claim 1, wherein the additional content comprises at least one of an overlay graphic, a title, or social interaction feedback.

8. The hardware encoder of claim 1, wherein the additional content is based on content associated with the input media stream.

9. The hardware encoder of claim 1, wherein, when the additional content is stored at the memory, the additional content is file locked.

10. The hardware encoder of claim 1, wherein, when the additional content is stored at the memory, the additional content is semaphore locked.

11. The hardware encoder of claim 1, wherein in response to a determination that particular additional content is unavailable at the memory, the encoding circuitry is configured to continue encoding the input media stream without the particular additional content.

12. The hardware encoder of claim 1, wherein the instance of a dynamic web page corresponds to a semitransparent image that is overlaid on top of content associated with the input media stream using alpha blending.

13. The hardware encoder of claim 1, wherein the instance of a dynamic web page corresponds to at least one image that is overlaid on top of content associated with the input media stream using an offset value.

14. A method comprising:
receiving an input media stream at a hardware encoder;
executing, at a processor of the hardware encoder, a headless browser to retrieve an instance of a dynamic web page that includes additional content;
storing the additional content at a memory that is accessible to the processor and accessible to encoding circuitry of the hardware encoder;
retrieving, at the encoding circuitry, the additional content from the memory; and
encoding, at the encoding circuitry, the input media stream to generate an output media stream in response to retrieving the additional content, at least one frame of the output media stream including at least a portion of the additional content retrieved from the memory in conjunction with at least a portion of a corresponding frame of the input media stream.

15. The method of claim 14, further comprising transmitting the output media stream to a publishing destination.

16. The method of claim 14, further comprising, in response to a determination that particular additional content is unavailable at the memory, continuing encoding of the input media stream without the particular additional content.

17. The method of claim 14, wherein the additional content comprises at least one of an overlay graphic, a title, or social interaction feedback.

18. The method of claim 14, wherein the additional content is based on content associated with the input media stream.

19. A non-transitory computer-readable medium comprising instructions that, when executed by a processor within a hardware encoder, cause the processor to:
- execute a headless browser to retrieve an instance of a dynamic web page that includes additional content for an input media stream; and
- store the additional content at a memory that is accessible to the processor and accessible to encoding circuitry of the hardware encoder;
- wherein the encoding circuitry is configured to:
  - retrieve the additional content from the memory; and
  - encode the input media stream to generate an output media stream in response to retrieving the additional content, at least one frame of the output media stream including at least a portion of the additional content retrieved from the memory in conjunction with at least a portion of a corresponding frame of the input media stream.

20. The non-transitory computer-readable medium of claim 19, wherein, in response to a determination that particular additional content is unavailable at the memory, the encoding circuitry is configured to continue encoding of the input media stream without the particular additional content.

* * * * *